United States Patent
Schulz et al.

(10) Patent No.: US 10,384,708 B2
(45) Date of Patent: Aug. 20, 2019

(54) INTERMEDIATE SHAFT ASSEMBLY FOR STEER-BY-WIRE STEERING SYSTEM

(71) Applicant: STEERING SOLUTIONS IP HOLDING CORPORATION, Saginaw, MI (US)

(72) Inventors: John F. Schulz, Hemlock, MI (US); Richard K. Riefe, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 26 days.

(21) Appl. No.: 15/262,130

(22) Filed: Sep. 12, 2016

(65) Prior Publication Data

US 2018/0072341 A1  Mar. 15, 2018

(51) Int. Cl.
| | | |
|---|---|---|
| *B62D 5/00* | (2006.01) | |
| *B62D 1/16* | (2006.01) | |
| *B62D 1/20* | (2006.01) | |
| *F16D 3/10* | (2006.01) | |
| *F16D 3/06* | (2006.01) | |
| *F16D 3/38* | (2006.01) | |

(52) U.S. Cl.
CPC .............. *B62D 5/003* (2013.01); *B62D 1/16* (2013.01); *B62D 1/20* (2013.01); *B62D 5/001* (2013.01); *F16D 3/10* (2013.01); *F16D 3/06* (2013.01); *F16D 3/38* (2013.01)

(58) Field of Classification Search
CPC ........ B62D 5/003; B62D 5/005; B62D 5/006; B62D 5/0421; B62D 5/0484; B62D 3/12
USPC ....................................................... 180/402
See application file for complete search history.

(56) References Cited

U.S. PATENT DOCUMENTS

| | | | |
|---|---|---|---|
| 4,315,117 A | 2/1982 | Kokubo et al. | |
| 4,337,967 A | 7/1982 | Yoshida et al. | |
| 4,503,300 A | 3/1985 | Lane, Jr. | |
| 4,503,504 A | 3/1985 | Suzumura et al. | |
| 4,561,323 A | 12/1985 | Stromberg | |

(Continued)

FOREIGN PATENT DOCUMENTS

| | | |
|---|---|---|
| CN | 1722030 A | 1/2006 |
| CN | 1736786 A | 2/2006 |

(Continued)

OTHER PUBLICATIONS

Gillespie, Thomas D.; "Fundamentals of Vehicle Dynamics"; Society of Automotive Enginers, Inc.; published 1992; 294 pages.

(Continued)

*Primary Examiner* — Kevin Hurley
*Assistant Examiner* — Felicia L. Brittman

(57) ABSTRACT

A steer-by-wire steering system includes a steering wheel. Also included is a steering shaft operatively coupled to the steering wheel and rotatable therewith. Further included is a steering gear input shaft operatively coupled to an electric power assist steering gear. Yet further included is an electric actuator operatively coupled to the electric power assist steering gear. Also included is a controller in operative communication with the steering shaft and the electric actuator for steering in a primary mode. Further included is an intermediate shaft assembly mechanically coupling the steering shaft to a rack and pinion assembly to steer in a redundant mode when communication between the steering shaft and the steering gear input shaft is not available.

16 Claims, 2 Drawing Sheets

(56) References Cited

U.S. PATENT DOCUMENTS

| | | |
|---|---|---|
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,240,284 A | 8/1993 | Takada et al. |
| 5,295,712 A | 3/1994 | Omura |
| 5,319,803 A | 6/1994 | Allen |
| 5,488,555 A | 1/1996 | Asgari |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A | 6/2000 | Pollmann |
| 6,138,788 A | 10/2000 | Bohner et al. |
| 6,170,862 B1 | 1/2001 | Hoagland et al. |
| 6,212,453 B1 | 4/2001 | Kawagoe et al. |
| 6,227,571 B1 | 5/2001 | Sheng et al. |
| 6,256,561 B1 | 7/2001 | Asanuma |
| 6,301,534 B1 | 10/2001 | McDermott, Jr. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,481,526 B1 | 11/2002 | Millsap et al. |
| 6,575,263 B2 | 6/2003 | Hjelsand et al. |
| 6,578,449 B1 | 6/2003 | Anspaugh et al. |
| 6,598,695 B1 | 7/2003 | Menjak et al. |
| 6,612,392 B2 | 9/2003 | Park et al. |
| 6,612,393 B2 | 9/2003 | Bohner et al. |
| 6,778,890 B2 | 8/2004 | Shimakage et al. |
| 6,799,654 B2 | 10/2004 | Menjak et al. |
| 6,817,437 B2 | 11/2004 | Magnus et al. |
| 6,819,990 B2 | 11/2004 | Ichinose |
| 6,820,713 B2 | 11/2004 | Menjak et al. |
| 6,889,792 B1 | 5/2005 | Fardoun et al. |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,150,581 B2 | 4/2012 | Iwazaki et al. |
| 8,170,725 B2 | 5/2012 | Chin et al. |
| 8,170,751 B2 | 5/2012 | Lee et al. |
| 8,260,482 B1 | 9/2012 | Szybalski et al. |
| 8,352,110 B1 | 1/2013 | Szybalski et al. |
| 8,374,743 B2 | 2/2013 | Salinger |
| 8,452,492 B2 | 5/2013 | Buerkle et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,632,096 B1 | 1/2014 | Quinn et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,725,230 B2 | 5/2014 | Lisseman et al. |
| 8,798,852 B1 | 8/2014 | Chen et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,159,221 B1 | 10/2015 | Stantchev |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,315,210 B2 | 4/2016 | Sears et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 9,725,098 B2 | 8/2017 | Abou-Nasr et al. |
| 9,810,727 B2 | 11/2017 | Kandler et al. |
| 9,845,109 B2 | 12/2017 | George et al. |
| 9,852,752 B1 | 12/2017 | Chou et al. |
| 9,868,449 B1 | 1/2018 | Holz et al. |
| 10,040,330 B2 | 8/2018 | Anderson |
| 10,137,929 B2 | 11/2018 | Aoki et al. |
| 2002/0016661 A1 | 2/2002 | Frediani et al. |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0133330 A1 | 7/2004 | Ono et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0155809 A1* | 7/2005 | Krzesicki ............... B62D 5/003<br>180/407 |
| 2005/0197746 A1 | 9/2005 | Pelchen et al. |
| 2005/0275205 A1 | 12/2005 | Ahnafield |
| 2006/0224287 A1 | 10/2006 | Izawa et al. |
| 2006/0244251 A1 | 11/2006 | Muller |
| 2006/0271348 A1 | 11/2006 | Rossow et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |

(56) References Cited

U.S. PATENT DOCUMENTS

| | | |
|---|---|---|
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2009/0024278 A1 | 1/2009 | Kondo et al. |
| 2009/0189373 A1 | 7/2009 | Schramm et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0224876 A1 | 9/2011 | Paholics et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0150388 A1 | 6/2012 | Boissonnier et al. |
| 2012/0197496 A1 | 8/2012 | Limpibunterng et al. |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0253765 A1 | 9/2013 | Bolourchi et al. |
| 2013/0292955 A1 | 11/2013 | Higgins et al. |
| 2013/0325202 A1 | 12/2013 | Howard et al. |
| 2014/0012469 A1 | 1/2014 | Kunihiro et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0152551 A1 | 6/2014 | Mueller et al. |
| 2014/0156107 A1 | 6/2014 | Karasawa et al. |
| 2014/0168061 A1 | 6/2014 | Kim |
| 2014/0172231 A1 | 6/2014 | Terada et al. |
| 2014/0277896 A1 | 9/2014 | Lathrop et al. |
| 2014/0277945 A1 | 9/2014 | Chandy |
| 2014/0300479 A1 | 10/2014 | Wolter et al. |
| 2014/0306799 A1 | 10/2014 | Ricci |
| 2014/0309816 A1 | 10/2014 | Stefan et al. |
| 2014/0354568 A1 | 12/2014 | Andrews et al. |
| 2015/0002404 A1 | 1/2015 | Hooton |
| 2015/0006033 A1* | 1/2015 | Sekiya .................. B62D 5/001 701/41 |
| 2015/0014086 A1 | 1/2015 | Eisenbarth |
| 2015/0032322 A1 | 1/2015 | Wimmer |
| 2015/0032334 A1 | 1/2015 | Jang |
| 2015/0051780 A1 | 2/2015 | Hahne |
| 2015/0060185 A1 | 3/2015 | Feguri |
| 2015/0120124 A1 | 4/2015 | Bartels et al. |
| 2015/0120141 A1 | 4/2015 | Lavoie et al. |
| 2015/0120142 A1 | 4/2015 | Park et al. |
| 2015/0123947 A1 | 5/2015 | Jubner et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0314804 A1 | 11/2015 | Aoki et al. |
| 2015/0324111 A1 | 11/2015 | Jubner et al. |
| 2015/0338849 A1 | 11/2015 | Nemec et al. |
| 2016/0009332 A1 | 1/2016 | Sirbu |
| 2016/0071418 A1 | 3/2016 | Oshida et al. |
| 2016/0075371 A1 | 3/2016 | Varunjikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0244070 A1 | 8/2016 | Bendewald et al. |
| 2016/0280251 A1 | 9/2016 | George et al. |
| 2016/0288825 A1 | 10/2016 | Varunjikar et al. |
| 2016/0291862 A1 | 10/2016 | Yaron et al. |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0355207 A1 | 12/2016 | Urushibata |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0364003 A1 | 12/2016 | O'Brien |
| 2016/0368522 A1 | 12/2016 | Lubischer et al. |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0066473 A1 | 3/2017 | Yu et al. |
| 2017/0101032 A1 | 4/2017 | Sugioka et al. |
| 2017/0101127 A1 | 4/2017 | Varunjikar et al. |
| 2017/0113712 A1 | 4/2017 | Watz |
| 2017/0151977 A1 | 6/2017 | Varunjikar et al. |
| 2017/0151978 A1 | 6/2017 | Oya et al. |
| 2017/0158055 A1 | 6/2017 | Kim et al. |
| 2017/0158222 A1 | 6/2017 | Schulz et al. |
| 2017/0203785 A1 | 7/2017 | Naik et al. |
| 2017/0225704 A1 | 8/2017 | Urushibata |
| 2017/0232998 A1 | 8/2017 | Ramanujam et al. |
| 2017/0240204 A1 | 8/2017 | Raad et al. |
| 2017/0293306 A1 | 10/2017 | Riefe et al. |
| 2017/0297606 A1 | 10/2017 | Kim et al. |
| 2017/0305425 A1 | 10/2017 | Xing |
| 2017/0305458 A1 | 10/2017 | Wang et al. |
| 2018/0015948 A1 | 1/2018 | Varunjikar et al. |
| 2018/0029632 A1 | 2/2018 | Bodtker et al. |
| 2018/0093700 A1 | 4/2018 | Chandy |
| 2018/0105198 A1 | 4/2018 | Bodtker et al. |
| 2018/0148087 A1 | 5/2018 | Wang et al. |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102320324 A | 1/2012 |
| CN | 102452391 A | 5/2012 |
| CN | 202563346 U | 11/2012 |
| CN | 102939474 A | 2/2013 |
| CN | 103419840 A2 | 12/2013 |
| CN | 103448785 A | 12/2013 |
| CN | 103677253 A | 3/2014 |
| CN | 103777632 A | 5/2014 |
| CN | 103818386 A | 5/2014 |
| CN | 104024084 A | 9/2014 |
| CN | 104968554 | 10/2015 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102008057313 A1 | 10/2009 |
| DE | 102010025197 A1 | 12/2011 |
| DE | 102012010887 A1 | 12/2013 |

(56) References Cited

FOREIGN PATENT DOCUMENTS

| | | |
|---|---|---|
| DE | 102014204855 A1 | 9/2014 |
| DE | 102014223128 A1 | 5/2016 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S60157963 A | 8/1985 |
| JP | S60164629 A | 8/1985 |
| JP | H05162652 A | 6/1993 |
| JP | 2768034 B2 | 6/1998 |
| JP | 2007253809 A | 10/2007 |
| JP | 2011043884 A | 3/2011 |
| JP | 20174099 A | 1/2017 |
| KR | 20100063433 A | 6/2010 |
| WO | 0147762 A1 | 7/2001 |
| WO | 2006099483 A1 | 9/2006 |
| WO | 2007034567 A1 | 3/2007 |
| WO | 2010082394 A1 | 7/2010 |
| WO | 2010116518 A1 | 10/2010 |
| WO | 2013080774 A1 | 6/2013 |
| WO | 2013101058 A1 | 7/2013 |

OTHER PUBLICATIONS

Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.

Van Der Jagt, Pim; "Prediction of steering efforts during stationary or slow rolling parking maneuvers"; Jul. 2013, 20 pages.

Varunjikar, Tejas; Design of Horizontal Curves With DownGrades Using Low-Order Vehicle Dynamics Models; A Theisis by T. Varunkikar; 2011; 141 pages.

CN Patent Application No. 201610575225.9 First Office Action dated Jan. 22, 2018, 10 pages.

English Translation of Chinese Office Action and Search Report for Chinese Application No. 2016103666609.X dated Dec. 20, 2017, 8 pages.

English Translation of Chinese Office Action and Search Report for Chinese Application No. 201610832736.4 dated Mar. 22, 2018, 6 pages.

Chinese Office Action and Search Report from the Chinese Patent Office for CN Application No. 201611096572.X dated Aug. 1, 2018, 20 pages.

Yan, et al., "EPS Control Technology Based on Road Surface Conditions," Jun. 22-25, 2009, pp. 933-938, 2009 IEEE International Conference on Information and Automation.

* cited by examiner

INTERMEDIATE SHAFT ASSEMBLY FOR STEER-BY-WIRE STEERING SYSTEM

BACKGROUND

The embodiments described herein relate to vehicle steering systems and, more particularly, to an intermediate shaft assembly for a steer-by-wire steering system.

Steer-by-wire vehicle systems traditionally do not have a mechanical connection between the steering wheel (and steering shaft) and the steering actuator located on the vehicle electrically power assisted steering gear. In the event of a power loss, for example, the driver is unable to provide directional control of the vehicle. Prior efforts include redundant emergency steering systems characterized by clutches that reconnect a traditional intermediate shaft to provide a mechanical steering connection.

SUMMARY

According to one aspect of the disclosure, a steer-by-wire steering system includes a steering wheel. Also included is a steering shaft operatively coupled to the steering wheel and rotatable therewith. Further included is a steering gear input shaft operatively coupled to an electric power assist steering gear. Yet further included is an electric actuator operatively coupled to the electric power assist steering gear. Also included is a controller in operative communication with the steering shaft and the electric actuator for steering in a primary mode. Further included is an intermediate shaft assembly mechanically coupling the steering shaft to a rack and pinion assembly to steer in a redundant mode when communication between the steering shaft and the steering gear input shaft is not available.

According to another aspect of the disclosure, an intermediate shaft assembly of a steer-by-wire steering system includes an outer shaft operatively coupled to a first joint. Also included is an inner shaft operatively coupled to a second joint, a portion of the inner shaft disposed within an interior of the outer shaft to form an overlapped region of the inner shaft and the outer shaft, the inner shaft and the outer shaft mechanically coupling a steering shaft to a steering gear input shaft. Further included is a first plurality of splines disposed on an inner surface of the outer shaft. Yet further included is a second plurality of splines disposed on an outer surface of the inner shaft, the first plurality of splines and the second plurality of splines having a clearance therebetween, the first and second plurality of splines engageable when communication between the steering shaft and the steering gear input shaft is not available.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
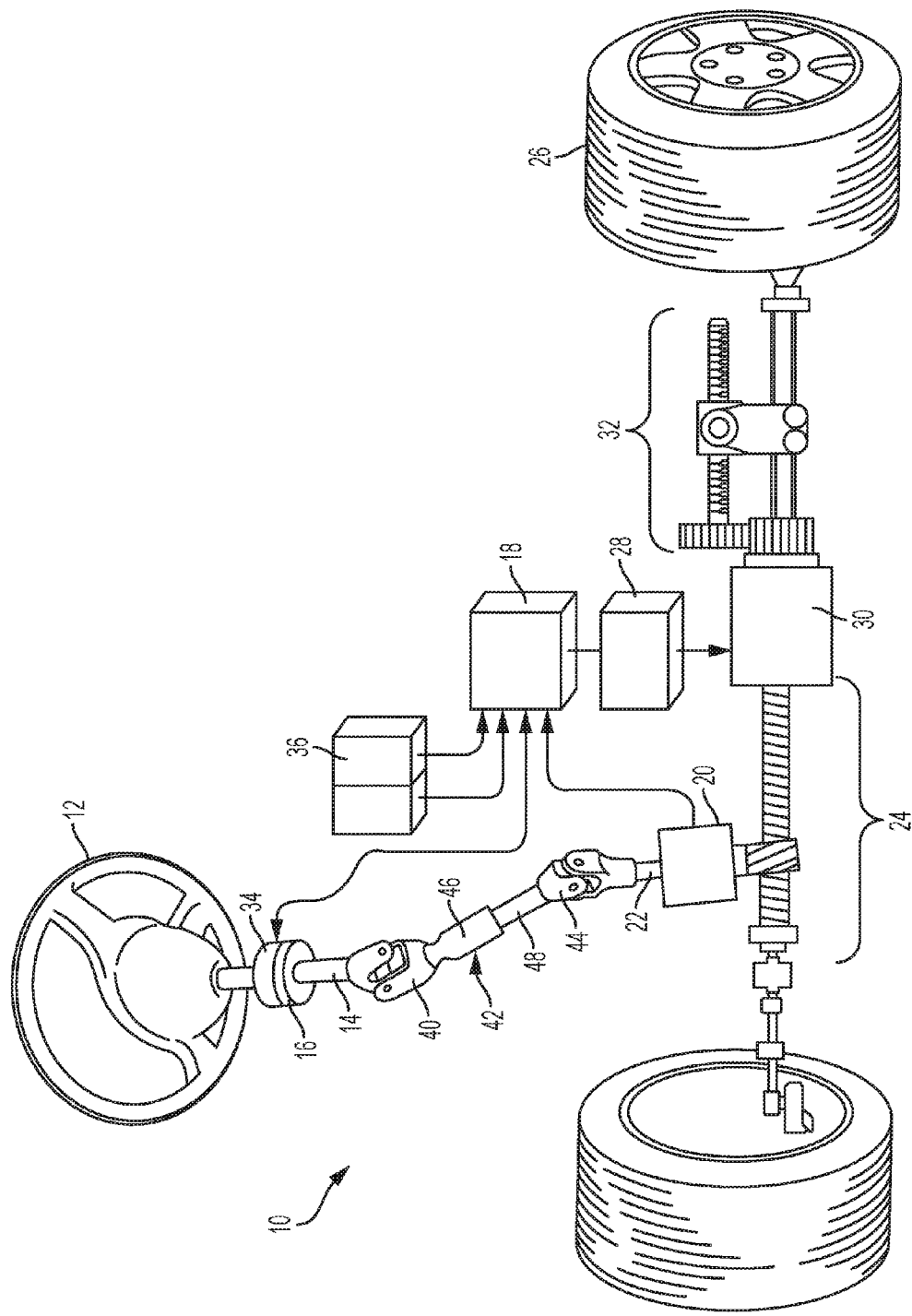
FIG. 1 is a perspective view of a vehicle steer-by-wire steering system.

Referring now to the Figures, where the invention will be described with reference to specific embodiments, without limiting same, FIG. 1 depicts a vehicle steering system 10. In particular, the vehicle steering system 10 is a steer-by-wire system that employs a control system and servos that interface with the vehicle such that the vehicle can be steered without mechanical linkage to a steering wheel.

In some embodiments disclosed herein, the steer-by-wire system 10 is part of an autonomous driving assisted steering (ADAS) system that is able to steer as well as control other parameters of the vehicle to operate it without direct driver involvement. Autonomous or semi-autonomous driving refers to vehicles that are configured to perform operations without continuous input from a driver (e.g., steering, accelerating, braking etc.) and may be equipped with technology that allows the vehicle to be autonomously or semi-autonomously controlled using sensing, steering, and/or braking technology.

The steer-by-wire system 10 includes a steering wheel 12 that is operatively coupled to a steering shaft 14. At least one sensor 16 detects angular position of the steering shaft 14, and thus the steering wheel 12 and is in operative communication with a controller 18. The controller 18 is also in operative communication with multiple other electrical components. For example, the controller 18 is in communication with a torque and rotation sensor 20 that detects a torque and rotation of a steering gear input shaft 22 that actuates a rack and pinion assembly 24. The rack and pinion assembly 24 maneuvers the wheels 26 of the vehicle to rotationally direct the vehicle. The controller 18 is also in communication with a driver 28 that interacts with a motor 30 of an electric power assist steering system 32 that assists a user with steering of the vehicle.

The operative communication between the above-described components of the steer-by-wire system 10 may be made with wired or wireless connections. In a primary steering mode, the electrical, operative communication between the components of the steer-by-wire system 10 is strictly relied upon to ensure rotational synchronization of the steering shaft 14 and the steering gear input shaft 22. Additionally, such a connection is required to maintain steering feedback to the driver with the electric power assist steering system 32. This is facilitated with a feedback actuator 34 that is coupled to the steering shaft 14 and in operative communication with the controller 18. The controller 18 may also receive additional data relating to the vehicle dynamics, such as vehicle speed and yaw rate, for example, from one or more detection components 36.

In the event that electrical communication between the steering shaft 14 and the steering gear input shaft 22 is unavailable, the capacity of the primary steering mode becomes diminished or disabled. In such a situation, the embodiments described herein continuously provide a mechanical linkage between the steering shaft 14 and the steering gear input shaft 22 to ensure that a redundant steering mode is available at all times of steering.

A first joint 40, such as a universal joint, is disposed at an end of the steering shaft 14 for coupling to a first end of an intermediate shaft 42. The intermediate shaft 42 is operatively coupled to a second joint 44, such as a universal joint, at a second end of the intermediate shaft 42. The second joint 44 is disposed proximate an end of the steering gear input shaft 22. Therefore, the steering shaft 14 and the steering gear input shaft 22 are mechanically coupled with the intermediate shaft 42.

Figure 2:
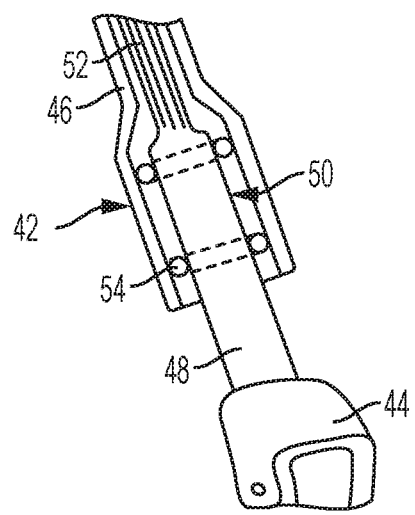
FIG. 2 is an enlarged, perspective, partial sectional view of a portion of the steering system.

Referring to FIG. 2, a portion of the intermediate shaft 42 is illustrated in greater detail. The intermediate shaft 42 includes an outer shaft 46 that is coupled to the first joint 40, such that the outer shaft 46 rotates with the steering wheel 12 and the steering shaft 14 at all times. The intermediate shaft 42 also includes an inner shaft 48 that is coupled to the second joint 44. A portion of the outer shaft 46 and the inner shaft 48 are disposed in an overlapped manner to form an overlapped region 50 of the intermediate shaft 42. In particular, a portion of the inner shaft 48 is disposed within a portion of the outer shaft 46.

A plurality of bearings 54 are disposed within the overlapped region 50 between the inner shaft 48 and the outer shaft 46 to ensure that rotation or torque is not transmitted to the remainder of the steering column. Specifically, rotation of the outer shaft 46 does not impart rotation of the inner shaft 48 during the primary driving mode of the steer-by-wire system 10, as a mechanical linkage is not required or desired during steer-by-wire operation. Additionally, the bearings 54 maintain the centrality of the inner shaft 48 and the outer shaft 46.

As described above, a redundant steering mode is available at all times with a mechanical coupling of the steering column provided by the intermediate shaft 42. An outer surface of the inner shaft 48 and an inner surface of the outer shaft 46 each include respective splines 52 within the overlapping region 50. A slight clearance is present between the splines of the outer and inner shafts to avoid the transmission of rotation and torque along the steering column during operation in the primary steering mode, as described above. However, if the electrical connections of the steer-by-wire system 10 are unavailable, the redundant steering mode is made available by engagement of the splines 52. Due to the clearance between the splines 52, a slight "steering dead band" is present over a predetermined range of angular displacement at the initial transfer between the primary and redundant steering modes. In some embodiments, the range is about 2 degrees to about 10 degrees of rotation before the splines loosely engage each other to allow steering input made by a driver to be mechanically transmitted from the steering shaft 14 to the steering gear input shaft 22.

To reduce contact noise made by contacting portions of the outer shaft 46 and the inner shaft 48, such portions are coated in some embodiments. For example, a plastic coating may be employed for noise reducing effects.

Advantageously, if the steer-by-wire system 10 experiences a power loss or other issue that diminishes operability, the driver is able to provide directional control with the redundant steering mode based on the mechanical coupling of the steering column that is continuously available.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steer-by-wire steering system comprising:
a steering wheel;
a steering shaft operatively coupled to the steering wheel and rotatable therewith;
a steering gear input shaft operatively coupled to an electric power assist steering gear;
an electric actuator operatively coupled to the electric power assist steering gear;
a controller in operative communication with the steering shaft and the electric actuator for steering in a primary mode; and
an intermediate shaft assembly mechanically coupling the steering shaft to a rack and pinion assembly to steer in a redundant mode when electrical communication between the steering shaft and the steering gear input shaft is not available, wherein the intermediate shaft assembly comprises:
an outer shaft operatively coupled to a first joint; and
an inner shaft operatively coupled to a second joint, a portion of the inner shaft disposed within an interior of the outer shaft to form an overlapped region of the inner shaft and the outer shaft that is engageable when electrical communication between the steering shaft and the steering gear input shaft is not available.

2. The steer-by-wire steering system of claim 1, further comprising:
a first plurality of splines disposed on an inner surface of the outer shaft; and
a second plurality of splines disposed on an outer surface of the inner shaft, the first plurality of splines and the second plurality of splines having a clearance therebetween, the first and second plurality of splines engageable when electrical communication between the steering shaft and the steering gear input shaft is not available.

3. The steer-by-wire steering system of claim 1, the intermediate shaft assembly further comprising a plurality of frictionless bearings disposed between the inner shaft and the outer shaft within the overlapped region.

4. The steer-by-wire steering system of claim 1, wherein the redundant mode is continuously available in the event of a loss of electrical communication between the steering shaft and the steering gear input shaft.

5. The steer-by-wire steering system of claim 1, further comprising a coating disposed on at least a portion of an inner surface of the outer shaft and an outer surface of the inner shaft within the overlapped region to reduce contact noise.

6. The steer-by-wire steering system of claim 5, wherein the coating comprises plastic.

7. A steer-by-wire steering system comprising:
a steering wheel;
a steering shaft operatively coupled to the steering wheel and rotatable therewith;
a steering gear input shaft operatively coupled to an electric power assist steering gear;
an electric actuator operatively coupled to the electric power assist steering gear;
a controller in operative communication with the steering shaft and the electric actuator for steering in a primary mode; and
an intermediate shaft assembly mechanically coupling the steering shaft to a rack and pinion assembly to steer in a redundant mode when electrical communication between the steering shaft and the steering gear input shaft is not available, wherein an outer shaft and an inner shaft of the intermediate shaft assembly are not engaged until rotation of a predetermined angular displacement of the outer shaft is made.

8. The steer-by-wire steering system of claim 7, wherein the predetermined angular displacement ranges from 2 degrees to 10 degrees.

9. The steer-by-wire steering system of claim 7, wherein the redundant mode is continuously available in the event of a loss of electrical communication between the steering shaft and the steering gear input shaft.

10. An intermediate shaft assembly of a steer-by-wire steering system comprising:
   an outer shaft operatively coupled to a first joint;
   an inner shaft operatively coupled to a second joint, a portion of the inner shaft disposed within an interior of the outer shaft to form an overlapped region of the inner shaft and the outer shaft, the inner shaft and the outer shaft mechanically coupling a steering shaft to a steering gear input shaft;
   a first plurality of splines disposed on an inner surface of the outer shaft; and
   a second plurality of splines disposed on an outer surface of the inner shaft, the first plurality of splines and the second plurality of splines having a clearance therebetween, the first and second plurality of splines engageable in a redundant mode when electrical communication between the steering shaft and the steering gear input shaft is not available.

11. The intermediate shaft assembly of claim 10, further comprising a plurality of frictionless bearings disposed between the inner shaft and the outer shaft within the overlapped region.

12. The intermediate shaft assembly of claim 10, wherein the redundant mode is continuously available in the event of a loss of electrical communication between the steering shaft and the steering gear input shaft.

13. The intermediate shaft assembly of claim 10, further comprising a coating disposed on at least a portion of an inner surface of the outer shaft and an outer surface of the inner shaft within the overlapped region to reduce contact noise.

14. The intermediate shaft assembly of claim 13, wherein the coating comprises plastic.

15. The intermediate shaft assembly of claim 10, wherein the outer shaft and the inner shaft are not engaged until rotation of a predetermined angular displacement of the outer shaft is made.

16. The intermediate shaft assembly of claim 15, wherein the predetermined angular displacement ranges from 2 degrees to 10 degrees.

* * * * *